Sept. 29, 1959   G. W. PAINTER   2,906,523
SPRING MOUNTING
Filed Dec. 6, 1957
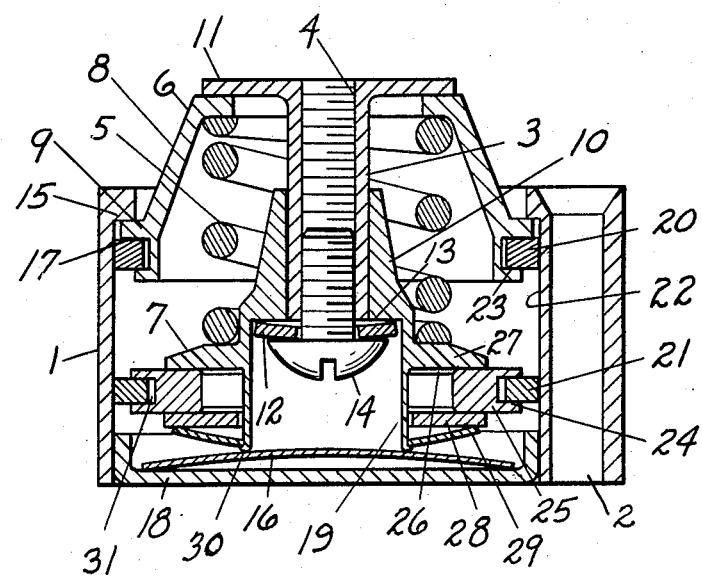
FIG.1
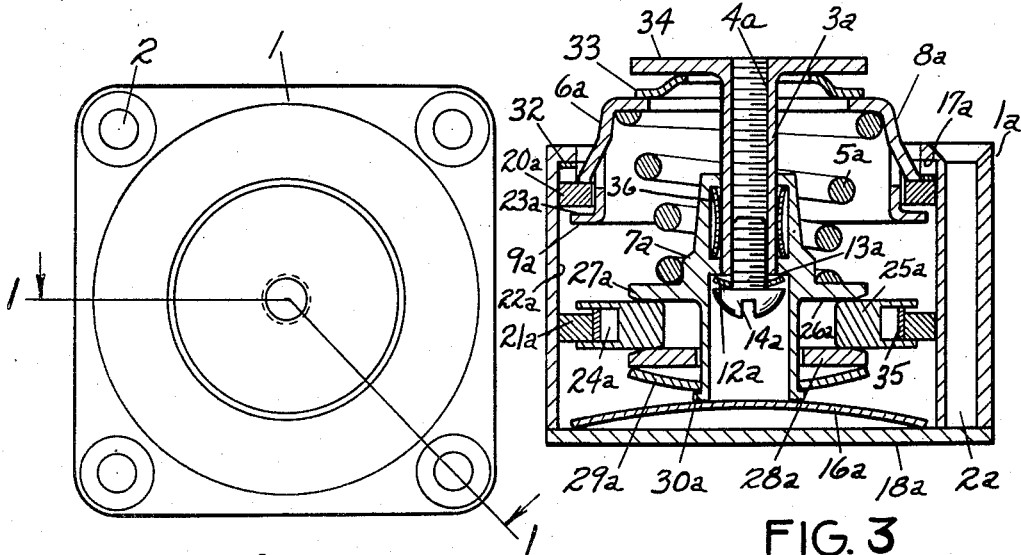
FIG.2
FIG.3
INVENTOR.
Giles W. Painter
BY Ralph Hammar
attorney

2,906,523
SPRING MOUNTING

Giles W. Painter, Erie, Pa., assignor to Lord Manufacturing Company, Erie, Pa., a corporation of Pennsylvania Application December 6, 1957, Serial No. 701,051

6 Claims. (Cl. 267—1)

This invention is a spring mounting which cushions in either of two opposite directions, which provides friction damping in all directions, and which remains quiet under load reversal.

In the drawings, Fig. 1 is an elevation in section on line 1—1 of Fig. 2; Fig. 2 is a top plan of the mounting; and Fig. 3 is a sectional elevation of a modification.

In the mounting, the supporting and supported members comprise a base 1 having attaching holes 2 and a stud 3 threaded at 4 to receive a bolt. Ordinarily, the base 1 will be attached to the support and the stud will be attached to the supported member although the attachment can be reversed.

The vertical or axial load is carried by a coil spring 5 arranged between axially spaced spring seats 6 and 7 which receive opposite ends of the spring. Both spring seats are generally annular in shape. The spring seat 6 has a conical portion 8 which depends around the coil spring and merges into a circular rim 9 at the lower end of the seat. The spring seat 7 has a cylindrical portion 10 which extends upwardly within the spring 5. From one aspect, the cylindrical portion 10 of the spring seat 7 is nested within the surrounding portion 8 of the spring seat 6.

At the center, the separation of the spring seats 6 and 7 is limited by axially spaced stops 11 and 12 on the stud 3. The stop 11 is a flange integral with the stud. The stop 12 is a spring washer held against a shoulder 13 on the under side of the cylindrical portion 10 by a screw 14 threaded into the stud. Both stops 11 and 12 engage the outer ends of the spring seats and confine the outward separation of the spring seats but in no way limit the movement of the spring seats toward each other. Axial separation of the spring seats 6 and 7 is also limited by axially spaced stops 15 and 16 on the base 1. The stop 15 is an inwardly extending projection integral with the base which engages a shoulder 17 on the spring seat 6. The stop 16 is a dished spring element resting on a header 18 fixed in the lower end of the base 1. The spring seat member 7 has a cylindrical portion 19 at its lower end which rests on the spring element 16. It will be noted that the stops 15 and 16 on the base 1 engage the outer ends of the spring seats 6 and 7 to limit movement of the spring seats away from each other but that the stops in no way limit the movement of the spring seats toward each other.

Friction damping in axial directions is effected by upper and lower friction members 20 and 21 each of which is resiliently held against the cylindrical inner surface 22 of the base 1. The amount of friction damping is determined by the pressure between the friction members and the surface 22. In the construction illustrated, the friction members 20 and 21 are made in the form of resilient rings and the pressure is derived solely from the inherent resilience of the rings although it could obviously be supplemented by separate springs as in automobile engine piston rings. The upper damping member 20 which is effective under downward load when the rim 9 has been moved away from the stop 15 is carried in a groove 23 in the rim 9. When the load is in an upward direction so that the rim 9 is held against the stop 15, there is no relative movement between the friction damping member 20 and the surface 22. This damping member is, accordingly, effective only when the downward load is sufficient to deflect the spring 5. When the load is primarily in an upward direction and is great enough to move the lower end 19 of the spring seat member 7 away from the spring element 16, damping is effected by the damping member 21 carried in a groove 24 in a ring 25. The ring 25 is itself carried in a groove 26 formed between a flange 27 on the spring seat member 7 and a washer 28 slidably carried on the spring seat member and urged upwardly by a spring 29 confined between the washer and a shoulder 30.

With the foregoing arrangement, when the load is predominantly downward, the rim 9 of the spring seat member 6 is held below the stop 15 and the damping in an axial direction is effected by the damping member 20. When the load is predominantly upward, the spring seat member 7 is moved upward so that its lower end is clear of the spring element 16 and under this condition the damping in an axial direction is effected by the damping member 21. Under some conditions, vibration may cause oscillation through the neutral position of the mounting, causing spring seat 6 to impact stop 15. This impact if uncushioned would set up shock waves. This is avoided in the present construction by the spring washer 12 which cushions the upward impact. Likewise spring 16 cushions downward impact which would occur between the lower end 30 of seat 7 and stop 18. Because of these two spring elements 12 and 16, upon load reversal shock waves are not set up and the mounting remains quiet under all conditions.

Friction damping in any radial direction is obtained by the friction contact between the annular ring 25 and the upper and lower sides of the groove formed by the surface 26 on the spring seat 7 and the washer 28. Because of the clearance provided at 31 between the damping member 21 and the groove 24, damping in a radial direction does not take place until the clearance 31 is taken up and the damping member 21 brought into solid contact with the bottom of the groove 24. This provides what is known as delayed damping in that the damping does not take place until the amplitude of movement exceeds the clearance. When the clearance 31 is reduced to zero, the delay in damping is eliminated. In addition to the damping in radial directions provided by the annular member 25, there is also the possibility of friction contact between the flange 11 and the upper end of the spring seat 6 or between the lower end of the spring seat 7 and the spring element 16. When the downward load is sufficient to hold the flange 11 in contact with the upper end of the spring seat 6, the friction contact supplements the damping provided by the annular element 25. Under these conditions, there will also be friction contact between the lower end of the spring seat 7 and the spring element 6. When the load is predominantly in an upward direction so that the flange 11 is moved clear of the upper end of the spring seat 6, the lower end of the spring seat 7 will also be clear of the spring element 16 so that there will be no supplementary damping of movement in a radial direction.

In the modification shown in Fig. 3 the parts of similar construction are indicated by corresponding reference numerals followed by the suffix $a$. As in the Fig. 1 and 2 mounting, the supporting member $1a$ is provided by holes $2a$ by which it may be attached to a suitable base and the supported member $3a$ is provided with a tapped hole $4a$ for connection to the article to be supported. The vertical load is carried by a coil spring $5a$ surrounding the stem of the supported member. The coil spring is arranged between upper and lower spring seats 6a and 7a, both seats being of generally annular shape. The rim 9a of the upper spring seat 6a carries a piston ring 20a which is urged by its inherent resilience outward against the surface 22a. When the load is in an upward direction, the ring is held against a spring washer 32 between it and the shoulder 17a on the supporting member 2. The spring washer 32 may be conveniently of the type known as a wave washer because when viewed edgewise it has an undulatory or wavelike appearance. The undulations of the wave washer take up the impact and prevent the generation of subharmonic vibrations. Damping in an upward direction is effected by a piston ring 21a carried in a groove 24a in a ring 25a. The ring 25a itself is carried in a groove 26a formed between a flange 27a on the spring seat member 7a and a washer 28a slidably carried on the spring seat member and urged upwardly by a spring 29a confined between the washer and a shoulder 30a.

With the foregoing arrangement, when the load is predominantly downward, damping is effected by the damping member 20a and when the load is predominantly upward, damping is effected by the damping member 21a. Radial damping is obtained by frictional contact between the ring 25a and the upper and lower sides of the groove formed by the surface 26a on the spring seat 7 and the washer 28a.

In mountings of this type, shocks or impacts resulting from the sudden take-up of lost motion are objectionable. These objectionable shock loads are prevented through the use of cushioning springs between the parts of the supporting and supported members which are likely to strike upon oscillation through the neutral position of the mounting. One of the springs 33 is arranged between the head 34 of the supported member 3a and the spring seat 6a. The spring 33 has enough capacity so that it does not bottom upon impact. Another spring of similar stiffness and function is the spring 12a arranged between the shoulder 14a on the spring seat 7a and the head of the screw 14a. The spring 33 is effective in cushioning downward movement of the supported member against the spring seat 6a while the spring washer 12a is effective in cushioning upward movement of the supported member 3a relative to the spring seat 7a. The springs 33 and 12a are supplemented by the spring 32 arranged between the shoulder 17a and the ring 20a carried by the spring seat 6a and by the spring washer 16a arranged between the header 18a on the supported member 1a and the lower end of the spring seat 7a. The additional springs 16a and 32 are supplementary in their action and ordinarily may be omitted. Each of these impact absorbing springs 16a, 12a, 33 and 32 has enough capacity to prevent bottoming solidly upon impact. These springs are best made as non-linear springs with an initially low spring rate which increases with increasing deflection. For example, spring 33 has enough capacity to accelerate spring seat 6a without bottoming. There are several forces which resist motion of the spring seat 6a such as its own inertia, the friction force of the damper ring 20a and any preload which may be present in the load spring 5a. The impact absorbing spring must be so designed that it will overcome these forces and start 6a into motion before spring 33 bottoms. The same applies to spring 12a and its associated parts. Springs 32 and 16a perform similarly except that they must decelerate rather than accelerate the spring seats with which they are respectively in contact in order to keep these seats from impacting sharply against either the base 18a or lip 17a of the holder. The purpose of the impact absorbing springs is to cause a cushioned transition rather than an abrupt shock as the surfaces are brought into load transmitting contact. For example, if the spring 33 were omitted, upon downward movement the head 34 on the supported member 3a could strike the upper end of the spring seat 6a thereby setting up a shock. From one aspect, the impact absorbing springs provide a stepped transfer of force. Impact spring 16 in Figure 1 reduces shock loads transmitted to the supporting structure which would occur if spring seat 7 at shoulder 30 should strike base 18. Impact spring 12 in Figure 1 prevents impact loads from being transmitted to the supported mass which would occur should screw head 14 strike 13 on spring seat 7. In Figure 3 impact springs 16a, and 12a, of course, provide the function which has already been described for springs 16 and 12 above. Spring 32 in Figure 3 prevents the impact load which would occur should ring 20a strike shoulder 17a and spring 33 prevents the impact load to the supported mass which would occur should head 34 strike 6a. The springs are strictly for the purpose of absorbing impact or shock loads which could occur when the mounting moves through the neutral position. They should have enough capacity to prevent their bottoming solidly upon impact.

The same stepped arrangement is used in the friction damping. For example, it will be noted that the ring 21a is substantially narrower or thinner than the groove within which it fits. If it were not for the presence of the expander spring 35 behind the ring 21a, there would be no damping action from the ring 21a until the clearance had been taken up. However, with the presence of the expander ring 35, there is always some damping force exerted by the ring 21a by reason of the frictional contact between the expander ring 35 and the ring 21a. The expander ring provides some damping although it is relatively less than the damping obtained when the clearance is taken up. Accordingly there is present in the damping action of the ring 21a an additional step of relatively light damping followed by a step of much heavier damping when the clearance between the ring and its groove are taken up. The light damping prevents subharmonic vibration, and the heavier damping prevents excessive vibration at resonance. The ring 21a is effective for damping when the spring seat 7a is lifted off the spring 16a, or in other words when the load is predominantly upward. Under these conditions, the ring 20a is solid against the shoulder 17a and does not take part in the damping. When the load is predominantly downward, then the spring seat 7a is held solid against spring 16a, and 16a is held on the bottom 18a of the supporting member and the ring 20a is moved away from the shoulder 17a. Under these conditions, there is a relatively light damping action introduced by the springs 36 surrounding the stem 3a of the supported member. The springs 36 provide relatively light damping action which is present until the clearance between the ring 20a and its groove 23a is taken up. As in the case of the ring 21a there is a step of relatively light damping followed by a step of heavier damping which comes into play only after the lost motion clearance between the ring 20a and its groove is taken up. Again, the light damping prevents subharmonic resonance, and the heavy damping prevents excessive vibration at resonance.

From one aspect the mounting is double acting in that it can accommodate either upward or downward loads and is therefore adapted to applications where there may be load reversal. In addition, the mounting provides a stepped build up of the force transmission to avoid impact, and has stepped damping to avoid subharmonic vibration in the isolation range and heavier damping to control resonance vibration.

What is claimed as new is:

1. In a spring mounting, a pair of axially spaced spring seats facing each other, a load carrying coil spring having its ends seated on the seats, an inner member slidably extending through the center of the spring seats and having axially spaced stops for limiting the movement of the spring seats away from each other, an outer member slidably surrounding the spring seats and having axially spaced stops for limiting the movement of the spring seats away from each other, at least one of the stops on each of the inner and outer members including an impact absorbing spring element, a friction element on each of the spring seats having surfaces slidably engaging one of said members, and a friction element on one of the spring seats having radially extending surfaces slidably engaging that seat.

2. In a spring mounting, supporting and supported members each having a pair of axially spaced stops, a pair of spring seats between said stops and axially movable toward each other and relative to each of the members, an axially extending coil spring having its ends on the seats urging the seats axially apart against said stops, a split ring in each spring seat having an axially extending friction surface, each seat having a carrying groove, and a cooperating friction surface for each ring on one of said members, said rings being urged by their inherent resilience into contact with their respective cooperating surfaces.

3. In a spring mounting, a pair of axially spaced spring seats facing each other, a load carrying coil spring having its ends seated on the seats, an inner member slidably extending through the center of the spring seats and having axially spaced stops for limiting the movement of the spring seats away from each other, an outer member slidably surrounding the spring seats and having axially spaced stops for limiting the movement of the spring seats away from each other, at least one of the stops on each of the inner and outer members including an impact absorbing spring element, a friction element on each of the spring seats having surfaces slidably engaging one of said members, the friction element on one of the seats being carried on a ring, said one seat having a groove in which said ring is radially slidable and providing a friction surface engaging the ring, and spring means for holding the ring against said friction surface.

4. In a spring mounting, supporting and supported members, one being an inner member having a stem and the other being an outer member surrounding said stem, a pair of axially spaced annular spring seat elements within said outer member and surrounding said stem, said inner member and said outer member each having a pair of axially spaced stops limiting the movement of the spring seat elements away from each other, each of said spring seat elements having a friction damping element frictionally engaging one of said members, a lost motion connection between each damping element and the associated spring seat element delaying the damping action until the amplitude of vibration is sufficient to take up the lost motion, supplementary friction damping means relatively weak compared to said friction damping elements for frictionally resisting movement of the spring seat elements before said lost motion is taken up, a load carrying coil spring arranged between said spring seat elements and urging the same apart, and spring means between the stops on one of said members and the spring seat elements for providing a stepped transfer of force from the stops to the spring seat elements to prevent shocks as the spring seat elements move against the stops.

5. In a spring mounting, supporting and supported members, one being an inner member having a stem and the other being an outer member surrounding said stem, a pair of axially spaced annular spring seat elements within said outer member and surrounding said stem, said inner member and said outer member each having a pair of axially spaced stops limiting the movement of the spring seat elements away from each other, each of said spring seat elements having a friction damping element frictionally engaging one of said members, a lost motion connection between each damping element and the associated spring seat element delaying the damping action until the amplitude of vibration is sufficient to take up the lost motion, supplementary friction damping means relatively weak compared to said friction damping elements for frictionally resisting movement of the spring seat elements before said lost motion is taken up, and a load carrying coil spring arranged between said spring seat elements and urging the same apart.

6. In a spring mounting, supporting and supported members, one being an inner member having a stem and the other being an outer member surrounding said stem, a pair of axially spaced annular spring seat elements within said outer member and surrounding said stem, said inner member and said outer member each having a pair of axially spaced stops limiting the movement of the spring seat elements away from each other, each of said spring seat elements having a friction damping element frictionally engaging one of said members, a load carrying coil spring arranged between said spring seat elements and urging the same apart, and spring means between the stops on one of said members and the spring seat elements for providing a stepped transfer of force from the stops to the spring seat elements to prevent shocks as the spring seat elements move against the stops.

References Cited in the file of this patent

UNITED STATES PATENTS

| | | |
|---|---|---|
| 2,402,400 | Hewitt et al. | June 18, 1946 |

FOREIGN PATENTS

| | | |
|---|---|---|
| 456,359 | Germany | Feb. 21, 1928 |
| 157,073 | Switzerland | Nov. 16, 1932 |
| 82,573 | Netherlands | Aug. 15, 1956 |